US011685481B2

(12) United States Patent
Missler et al.

(10) Patent No.: US 11,685,481 B2
(45) Date of Patent: Jun. 27, 2023

(54) SELF-PROPELLED HYDROFOIL SURFBOARD

(71) Applicant: MSLR Electric Incorporated, Kelowna (CA)

(72) Inventors: Carey Andrew Joseph Missler, Kelowna (CA); Taylor Robert Coulthard, Vancouver (CA)

(73) Assignee: MSLR Electric Incorporated, Kelowna (CA)

( * ) Notice: Subject to any disclaimer, the term of this patent is extended or adjusted under 35 U.S.C. 154(b) by 8 days.

(21) Appl. No.: 17/199,004

(22) Filed: Mar. 11, 2021

(65) Prior Publication Data
US 2022/0194525 A1 Jun. 23, 2022

(30) Foreign Application Priority Data
Dec. 22, 2020 (CA) .................................. CA 3103526

(51) Int. Cl.
| | |
|---|---|
| *B63B 32/10* | (2020.01) |
| *B63B 32/50* | (2020.01) |
| *B63B 32/40* | (2020.01) |
| *B63B 1/24* | (2020.01) |
| *B63B 45/04* | (2006.01) |

(Continued)

(52) U.S. Cl.
CPC .............. *B63B 32/10* (2020.02); *B63B 1/246* (2013.01); *B63B 32/40* (2020.02); *B63B 32/50* (2020.02); *B63B 45/02* (2013.01); *B63B 45/04* (2013.01); *B63H 21/21* (2013.01); *B63H 21/22* (2013.01);

(Continued)

(58) Field of Classification Search
CPC ......... B63B 1/246; B63B 32/10; B63B 32/40; B63B 32/50; B63B 32/60; B63B 45/00; B63B 45/02; B63B 45/04; B63B 45/06; B63H 21/17; B63H 21/21; B63H 2021/216; B63H 21/22; G05D 1/0016
See application file for complete search history.

(56) References Cited

U.S. PATENT DOCUMENTS 9,102,386 B2 * 8/2015 Roach .................... B63B 32/40
9,359,044 B2 6/2016 Langelaan
(Continued)

FOREIGN PATENT DOCUMENTS

| CN | 112407160 A * | 2/2021 |
|---|---|---|
| CN | 210526789 U | 5/2021 |
| WO | WO-2022037809 A1 * | 2/2022 |

OTHER PUBLICATIONS

Workman, Christian, Examiner's Requisition, dated Jul. 9, 2021, 5 pages, Canadian Intellectual Property Office, Gatineau, Quebec, Canada.

(Continued)

*Primary Examiner* — Ajay Vasudeva
(74) *Attorney, Agent, or Firm* — Field LLP (57) ABSTRACT

A self-propelled hydrofoil surfboard includes a surfboard having a mast mounted to the lower surface of the surfboard, a selectively controllable thruster mounted at a lower end of the mast, a controller and a battery to supply power to the controller and thruster, the controller cooperating with a remote controller adapted to give control inputs to the controller and to be carried when in use by a rider, navigation lights mounted around at least a portion of the circumferential edge of the surfboard, and wherein the mast may have an adjustable length.

10 Claims, 6 Drawing Sheets

(51) Int. Cl.
  *B63H 21/21* (2006.01)
  *B63H 21/22* (2006.01)
  *B63B 45/02* (2006.01)
  *G05D 1/00* (2006.01)

(52) U.S. Cl.
  CPC ..... *G05D 1/0016* (2013.01); *B63H 2021/216* (2013.01)

(56) References Cited

U.S. PATENT DOCUMENTS

| | | | |
|---|---|---|---|
| 10,253,969 B2* | 4/2019 | Voaklander | B63B 45/00 |
| 10,773,778 B1 | 9/2020 | Shaffer et al. | |
| 2017/0225754 A1* | 8/2017 | Keddington | B63B 45/04 |
| 2018/0370600 A1 | 12/2018 | Geislinger | |

OTHER PUBLICATIONS

Workman, Christian, Examiner's Requisition, dated Nov. 9, 2021, 5 pages, Canadian Intellectual Property Office, Gatineau, Quebec, Canada.

Bender, Fredrik et al., Final Report Evolo, Marine design/ Lightweight design, Apr. 23, 2009, 84 pages, Royal Institute of Technology, Stockholm, Sweden.

Screen capture from YouTube video clip entitled "Nocqua 2000 Complete Product Overview", 1 page, uploaded on Nov. 9, 2021. Retrieved from Internet: https://www.youtube.com/watch?v=Ap44107eQbg.

\* cited by examiner

SELF-PROPELLED HYDROFOIL SURFBOARD

FIELD OF THE INVENTION

The present invention relates to the technical field of electrically propelled surfboards and, in particular to a surfboard having a mast-mounted hydrofoil and electrically driven underwater thruster.

BACKGROUND

In the prior art, U.S. Pat. No. 9,359,044, which issued to Langelaan, discloses a passively stable personal hydrofoil watercraft that has a flotation device, wherein a user can ride in a prone, kneeling, or standing position. The watercraft includes a strut or mast having an upper end interconnected with the flotation device and lower end connected with a hydrofoil. The watercraft also includes a propulsion system connected to the hydrofoil. Both longitudinal and directional control of the watercraft is via weight shifting by the rider.

In the prior art, applicant is also aware of U.S. Pat. No. 10,773,778 which issued on Sep. 15, 2020, to Shaffer et. al. which discloses the use of a disc shaped LED light housing for mounting on the upper surface of a surfboard, wherein the lights are activated by contact with water.

Chinese utility model, no. CN210526789, incorporated herein by reference, which granted on May 15, 2020, discloses a hydrofoil watercraft wherein an underwater propeller is installed on a mast which extends from the bottom of a surfboard. A drive motor and the propeller are connected by a reduction mechanism. The setting of the reduction mechanism enables the rotation speed of the propeller to be low so as to increase the output torque of the motor. This makes it easier for the surfer to control surfing during fast surfing or when the motor has just started. The setting of the reducer can use a small torque drive motor to achieve a larger output torque, so it can save power and improve the endurance of the power supply unit. The propeller speed is low when the underwater propeller starts, giving a stable thrust for a surfer to control the surfboard, and providing improved surfboard balance when surfing at high speed. The driving motor of the underwater propeller rotates under the control of a controller. A drive shaft rotates the motor and propeller synchronously. A planetary gear transmission reduces the rotation speed.

The self-propelled hydrofoil surfboard includes a surfboard body, a power unit, and a controller provided in the body of the surfboard. The mast is hollow and is mounted to, so as to depend downwardly from the bottom of the surfboard body. The lower end of the mast is connected to the hydrofoil. The lower end of the mast, near the hydrofoil, is connected to the thruster. The thruster, such as the propeller, is driven by the motor and power unit which is electrically connected to the controller and the underwater thruster through wires in the mast, and provides electrical energy to the thruster.

Preferably, a sealed watertight compartment is built in the top of the body of the surfboard.

A cover plate seals the opening into the compartments. The sealed compartment contains the power supply and the controllers mounted in slots in the compartment.

The power supply is mounted in a first slot. The controller is mounted in a second slot. Preferably, a heat sink is connected to the bottom of the second slot. A plurality of heat radiating fins on the bottom of the heat sink pass through the bottom of the surfboard body so as to be disposed outside the surfboard body.

Preferably, a remote control sends instructions to the controller, so as to control the drive motor. The body of the surfboard is equipped with a receiver that wirelessly communicates with the remote control. The receiver is connected to the controller.

When the surfboard is running smoothly on the water surface, the bottom of the heat sink and the water surface are in contact for heat dissipation. When the surfboard is flying on the water surface due to the lifting action of the hydrofoil lifting the surfboard off the water surface, the heat dissipation fins at the bottom of the heat dissipation base contact the flowing air and water spray to dissipate heat.

SUMMARY

As self-propelled hydro-foil surfboards become commercially feasible and socially accepted as both a means of travel and recreation, one of the problems that remains to be overcome is the use of such hydro-foil surfboards when the sun goes down, or before day-break. In many countries, especially those with tropical climates or during the summer in those countries, a drop in ambient air temperature at dusk, or the colder air temperatures culminating just before dawn, remain still sufficiently warm so as to not inhibit the use of hydrofoil surfboards.

However, in many jurisdictions, powered watercraft of any kind are prohibited from operation from dusk until dawn if the watercraft do not have night-time running lights or navigation lights (hereinafter collectively referred to as navigation lights). Consequently, the problem to be solved, and the solution to which comply with local, state or federal regulations ion to which is one of the objects of the present invention in one of at least two aspects, is how to provide for night time navigation lights for use on a surfboard so that the navigation lights do not protrude upwardly from the upper surface of the surfboard so as to present an injury hazard, and yet are elevated above the surface of the water so that the navigation lights can be seen from a distance. If the navigation lights cannot be seen from distance, in applicant's view, it is unlikely that such lights will meet the applicable regulations.

A second aspect of the present invention seeks to overcome an existing problem in training surfers in the use of a hydrofoil surfboard.

As described above, on a hydrofoil surfboard, an elongate mast protrudes downwardly underneath the surfboard. The motorized propulsion, such as a propeller, is mounted to the lower or lower-most end of the mast. The hydrofoil lift wing or wings are also mounted at the lower or lower-most end of the mast.

In applicant's experience, the longer the mast, the more difficult it is for a beginner in training to use a hydrofoil surfboard to master its use. The best approach observed by the applicant is for a short mast, for example under 70 centimeters in length, to be used initially for a beginner starting training, and as the training progresses to incrementally increase the length of the mast. An expert user would then have graduated to a maximum typical length of mast, for example 100 centimeters or longer, measured along the long axis of the mast.

The difficulty is that, for a beginner, that user may have to rent hydrofoil surfboards for some time in order to avoid having to purchase either a series of different hydrofoil surfboards, or a series of different length masts, swapping masts from shorter to longer masts as the user gains experience. Similarly, the problem exists in the context of a surfing school training users on hydrofoil surfboards, where conventionally the school may have to have at least a small fleet of hydrofoil surfboards having different length masts, or have to swap masts on their hydrofoil surfboards to change the mast length depending on the experience of the user using any particular board on any particular day.

Expert hydrofoil surfboarders may also find that they may want to use either shorter or longer lengths of mast, depending on what style of riding they intend on doing. Quicker, sportier maneuvers may employ a shorter mast, whereas longer cruising with only gentle arcuate turns may employ a longer mast. Like any user, the expert would rather quickly and easily change the length of the mast rather than change masts or change boards.

The solutions to at least the two above identified problems are set out below.

The present disclosure thus describes a self-propelled hydrofoil surfboard which includes:

(a) a surfboard having a bow, a stern, and a circumferential edge extending completely around and between an upper surface of the surfboard and a lower surface of the surfboard, (b) a mast mounted to the lower surface of the surfboard so as to extend orthogonally therefrom, (c) a selectively controllable thruster mounted at a lower end of the mast to provide selectively controllable forward acceleration to the surfboard, (d) a power controller mounted in the surfboard and cooperating with the thruster to selectively control the amount of thrust produced by the thruster to provide the forward acceleration of the surfboard.

The power controller cooperates with a remote controller which is adapted to give control inputs from a user to the controller and to be carried when in use by a rider riding on the surfboard and simultaneously providing the inputs to the power controller.

A rechargeable battery is removably mounted in the surfboard and in electrical communication with the power controller and the thruster to provide electric power to the power controller and to the thruster.

Navigation lights are advantageously mounted around at least a portion of the circumferential edge of the surfboard. The navigation lights may include LED lights, and may in a preferred embodiment extend at least around the bow of the surfboard. Usefully, the navigation lights may include red lights on a port side of the bow, and green lights on a starboard side of the bow. In one embodiment, the navigation lights may extend the full length of the surfboard, along both the port and starboard sides of the surfboard, and may also wrap around the rear of the surfboard.

In another embodiment, not intended to be limiting, the navigation lights only include red coloured lights on the port side and green coloured lights on the starboard side in the absence of natural daylight, and so may include other than red or green lights in the presence of natural daylight. In one embodiment the lights in the absence of natural daylight are a nighttime mode, and the lights in the presence of natural daylight are in a daytime mode, and wherein a user selectively switches between nighttime and daytime modes by providing an input to a light controller, which may form part of the power controller.

In an advantageous embodiment, the mast is adapted to have a selectively adjustable length. For example, the mast may be telescopically adjustable to selectively adjust the length of the mast.

The present disclosure also describes a method of using the hydrofoil surfboard, such as the hydrofoil surfboard embodiments summarized above, which includes the following steps:

(a) a rider boards the surfboard while it is floating on a body of water and provides control input to the power controller, and hence to the thruster, to accelerate the surfboard to a lifting velocity of the hydrofoil surfboard whereat the surfboard and rider are elevated on the hydrofoil above the waterline of the body of water by the lift produced by the hydrofoil wings moving forwardly through the water; and, (b) the rider provides control input to a light controller in the surfboard to illuminate navigation lights on the edges of the surfboard so as to selectively display at night at least red port lights and green starboard lights from the corresponding port and starboard edges of the surfboard.

DETAILED DESCRIPTION OF EMBODIMENTS OF THE INVENTIONS

Figure 1:
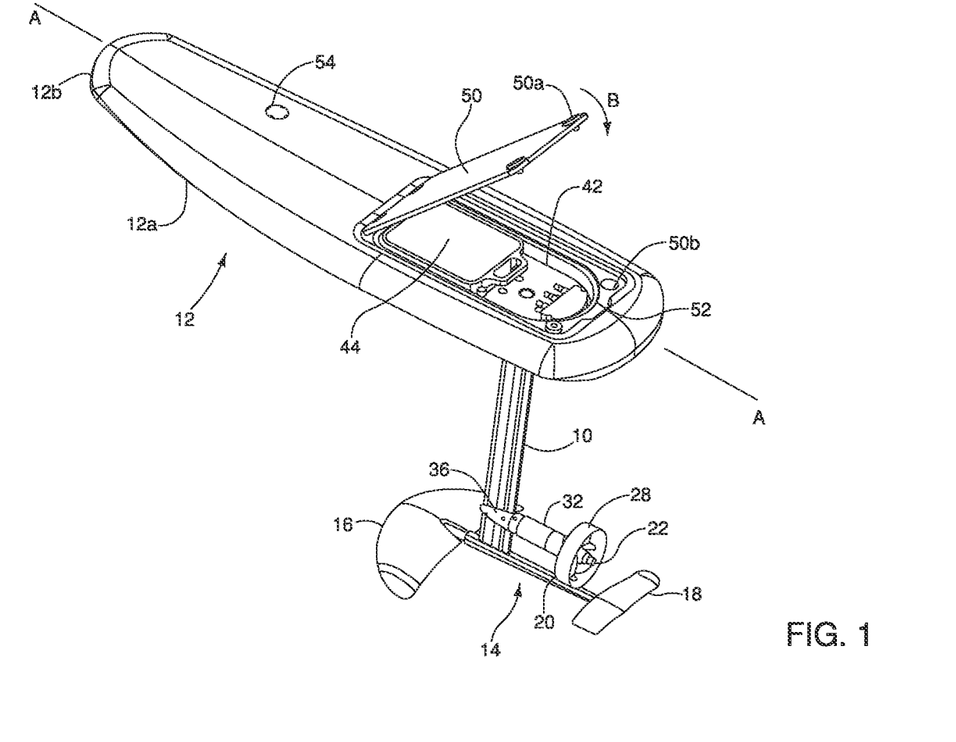
FIG. 1 is a left side, rear, top perspective view of a self-propelled hydrofoil surfboard, as modified from the drawing figures in utility model CN 210526789.

As seen in FIG. 1, elongate mast 10 is mounted on the bottom surface of surfboard 12 so as to depend downwardly therefrom. Mast 10 may extend perpendicularly underneath surfboard 12 as illustrated or may be raked rearwardly or forwarded at a small angle relative to perpendicular, generically referred to herein as extending orthogonally from the bottom of the surfboard 12. If the mast is a single mast 10, and the present disclosure is intended to encompass embodiments having one or more masts, the uppermost end of mast 10 will be mounted to the underside of surfboard 12 along the centroidal longitudinal axis A of surfboard 12, so as to lie in a plane, and extend, orthogonal to the bottom surface of the surfboard. Typically, mast 10 is located towards the rear of the surfboard, for example in the position as illustrated in the accompanying drawings wherein similar characters of reference are intended to refer to the same components in each view.

Mast 10 may be hollow, defining a bore through which a power supply cable (not shown) passes to supply power to an electric motor 34 coupled to the lower end of the mast.

Figure 2:
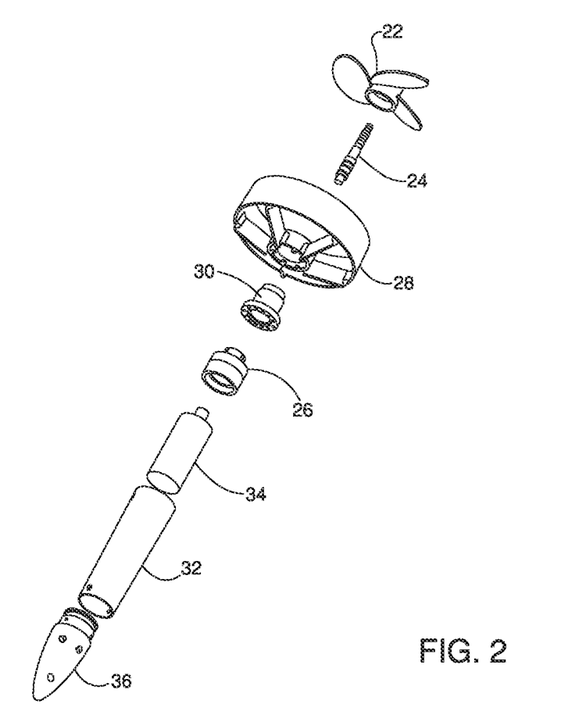
FIG. 2 is an exploded view of the propeller and motor assembly of the hydrofoil surfboard of FIG. 1, as modified from the drawing figures in utility model CN 210526789.

As better seen in FIG. 2, an underwater propeller 22 is mounted to the rearmost end of a drive shaft 24. Drive shaft 24 is coupled to transmission 26. Transmission 26 may be a planetary speed reduction mechanism to reduce the rotational speed of drive shaft 24. Propeller 22 is positioned so as to rotate within a cowling 28 mounted on hub 30. Hub 30 is mounted to a hollow tubular housing 32. The electric motor 34 and transmission 26 are mounted in housing 32 and are operatively coupled so as to rotate drive shaft 24, and thereby rotate propeller 22 correspondingly to provide forward propulsion to the hydrofoil surfboard.

Hydrofoil 14 is connected to the lower end of mast 10, and includes a front wing 16 and a rear wing 18, connected to one another, and to mast 10 by a longitudinally oriented, horizontal rod 20.

Figure 3:
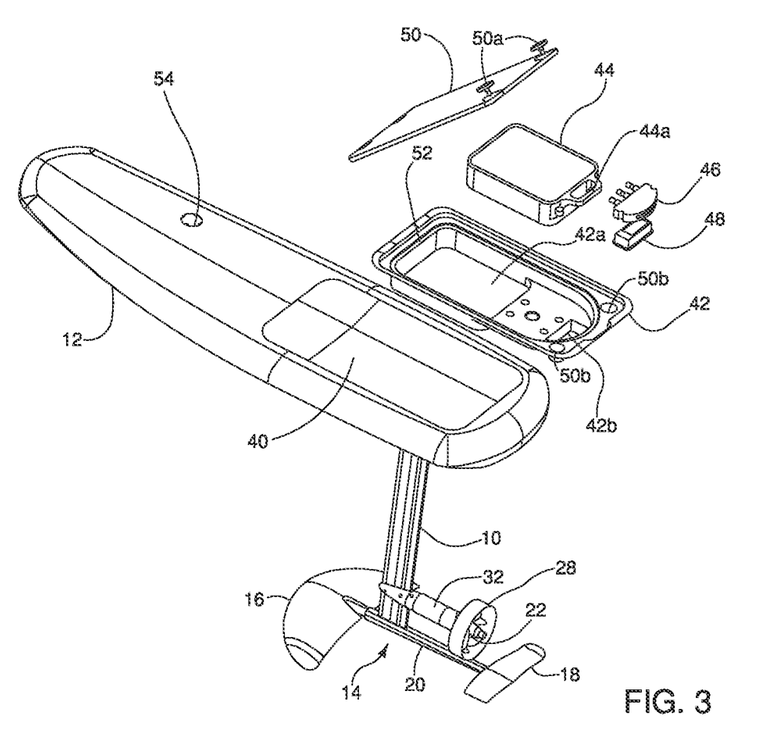
FIG. 3 is an exploded view of the battery and controller housing of the hydrofoil surfboard of FIG. 1, as modified from the drawing figures in utility model CN 210526789.
Figure 4:
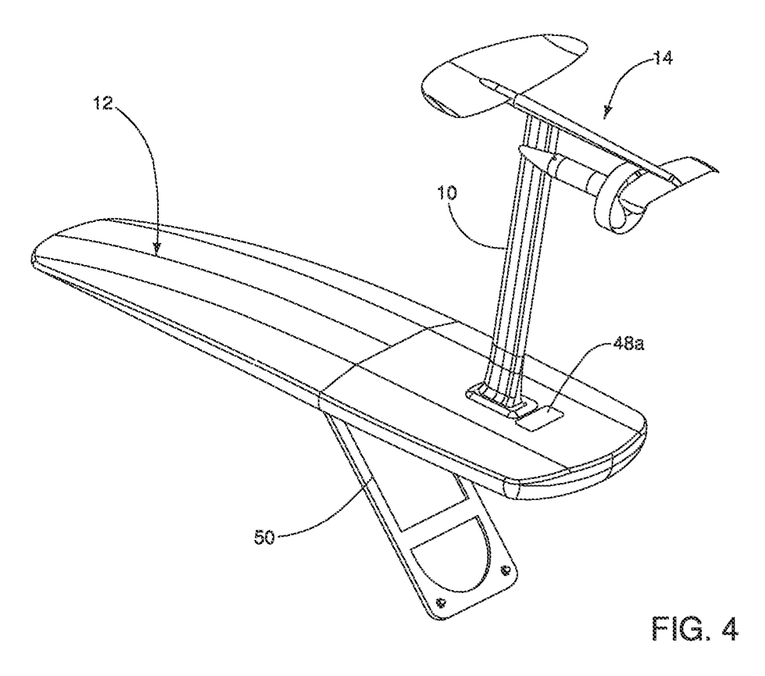
FIG. 4 is a bottom perspective view of the hydrofoil surfboard of FIG. 1, as modified from the drawing figures in utility model CN 210526789.

As better seen in FIG. 3, the upper surface of surfboard 12 includes a depression or cavity 40 formed therein, and shaped to receive a sealed or sealable container or tray 42. Tray 42 is provided for mounting a power supply such as battery 44. An electronic controller 46 powered by battery 44 cooperates with, so as to control, motor 34. Battery 44 also provides power to electric motor 34. A handle 44a may be provided on battery 44 for ease of removal for charging and installation of battery 44 into its corresponding installation slot 42a in tray 42. A second installation slot 42b is provided for mounting a heat sink under controller 46. An underside of heat sink 48 supports heat exchanging cooling fins 48a which protrude from the bottom surface of surfboard 12. A cover plate 50 is pivotally mounted by hinges 50a at its forward end to the corresponding forward end of tray 42. Cover plate 50 is sized so that, when rotated about hinges 50a in direction B from its open position seen in FIGS. 1 and 4, to its closed position flush down against the circumferential rim of tray 42, and in particular against circumferential sealing gasket or sealing ring 52, cover plate 50 provides a water tight seal and protective cover over tray 42, and lies flush along the upper surface of surfboard 12. Cover 50 is releasably secured in its closed position by means of fasteners such as the threaded latching bolts 50a engaging correspondingly threaded female apertures 50b in tray 42. Preferably, the heads of latching bolts 50a have recessed flanges or the like for ease of gripping by a user seeking to release the fasteners to open or close cover 50.

In the illustrated embodiment, and without intending to be limiting, the operation of motor 34 may be remotely controlled via controller 46 by the use of a wireless remote control 56 (seen held by the rider in FIG. 6) which is carried by the rider while riding surfboard 12. Because the remote control is wireless, a receiver is employed, which may for example be a radio frequency receiver using Bluetooth™. The receiver may be located for example as shown for receiver 54 in the forward end or bow, on the upper surface of surfboard 12.

The remote control 56 advantageously includes a throttle actuator, such as for example a trigger (not shown) which produces a signal to the receiver, and hence to the controller, wherein the strength or pressure of the pull on the trigger or the distance the trigger is moved by the user's finger, or a combination of both pressure and displacement, produces a corresponding throttle input to increase or decrease the motor speed. An increase in motor speed increases the speed of rotation of the propeller and produces increased thrust and forward acceleration. The remote control may also include pre-set toggle switches or the like for the user to toggle between motor modes; for example between a sport mode having increased available acceleration (but reduced battery charge endurance) and an economy mode having reduced available loading on the motor and corresponding reduced available acceleration, and hence increased battery endurance and travel range.

Figure 5A:
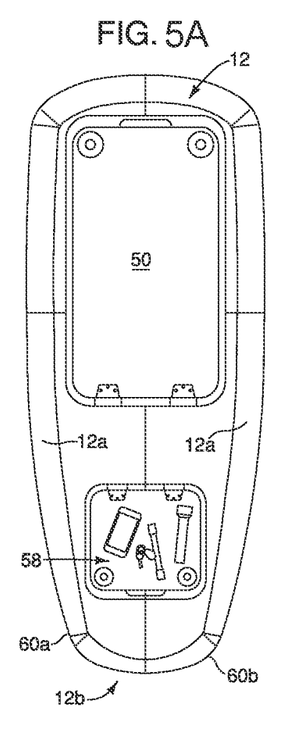
FIG. 5A is a plan view of an embodiment of a hydrofoil surfboard according to one aspect of the present disclosure showing circumferentially extending LED navigation lights around the entire circumference of the surfboard, with red LED lights around the port side and green LED lights around the starboard side. A watertight storage compartment located in the bow of the surfboard, with its cover removed to show an example of its contents is also seen illustrated.
Figure 5B:
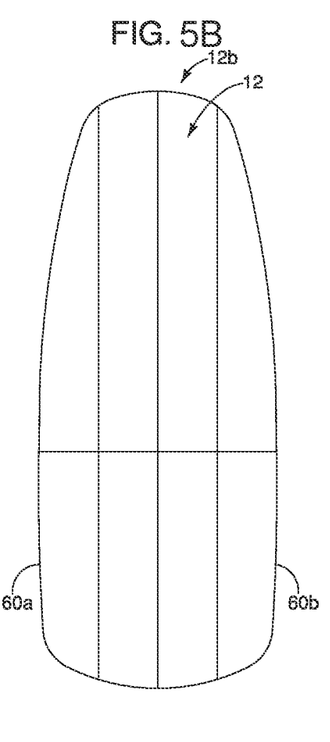
FIG. 5B is a bottom view of the surfboard portion of the hydrofoil surfboard of FIG. 5A.
Figure 5C:
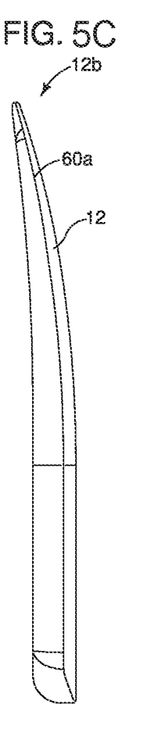
FIG. 5C is a starboard side elevation view of the surfboard of FIG. 5B.
Figure 5D:
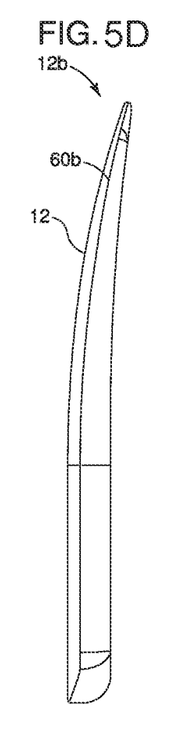
FIG. 5D is a port side elevation view of the surfboard of FIG. 5B.

Various further features may be included, although not intending to be limiting, such as for example, a further water-tight storage compartment 58 for storage of cellular telephones, keys, etc. as shown by way of example in FIG. 5A, which may be accessed by a user from the upper surface of surfboard 12. A tilt sensor and associated tilt indicator (not shown) may also be included, for example so that the indicator is visible on the upper surface of surfboard 12. The tilt indicator may assist the user while riding, and may show both longitudinal tilt (pitch) and lateral tilt (roll). The tilt sensor(s) may be for example gravity detecting accelerometers as would be known to one skilled in the art.

Returning now to the two problems outlined above relating to, firstly, the need for a night-time use hydrofoil surfboard to have navigation lights; and, secondly, the need for easily changing the length of the surfboard mast, what follows are applicant's proposed solutions.

As seen commencing in FIG. 5A, a surfboard 12 is modified so as to incorporate navigation lights in the circumferential edges 12a of the surfboard. In particular, and without intending to be limiting, as other forms of lighting would also work as would be known to one skilled in the art, light emitting diode (LED) lights 60a, 60b are mounted into and around edges 12a of surfboard 12. For the purpose of navigation lights that can be seen at a distance at night, the LED lights, in sufficient density and light intensity are mounted around edges 12a preferably including around bow 12b of surfboard 12. It is only because surfboard 12 is a hydrofoil surfboard that having navigation lights built into the edges of a surfboard would work for the important purpose of navigation lights at night; vis, so that the hydrofoil surfboard may be seen at a distance by other watercraft so as to avoid collision. Ordinarily, merely putting lights around the circumference of a surfboard would be pointless for the purpose of nighttime navigation lights, because on a standard non-hydrofoil surfboard, the edges of the surfboard would either be right on the waterline, or slightly beneath the waterline depending on wave action, the weight load on the surfboard, and whether the surfboard is of the reduced floatation semi-sinking variety. A hydrofoil surfboard on the other hand, once it is moving forward and underway at its minimum lift velocity so as to cause the surfboard 12 to rise out of the water under the lifting influence of the hydrofoil wings 16, 18, elevates the edges 12a clear of the waterline, and sufficiently so that navigation lights built into the edges 12a, including around bow 12b, actually function for the purpose of night-time navigation lights.

The LED navigation lights 60 may take many forms, and still function as nighttime navigation lights. For example, they may be a string of LED lights contained within a sealed watertight flexible sleeve or tube that is installed into a correspondingly shaped peripheral channel extending part way around or all the way around edges 12a. This embodiment then may remove the need for any form of transparent cover to be mounted over the LED lights to protect them from harm or water incursion. In other embodiments, the LED lights may be installed singularly, rather than in strings, into edges 12a, and may need to be each covered with a transparent cover. Alternatively, a combination of a string or strings of LED lights may be combined with singularly mounted LED lights. For example, it may be desired or needed to boost the illumination levels of the LED lights located at the bow 12b, as compared to the illumination levels around elsewhere on edges 12a, in order to properly function as nighttime navigation lights. So presuming that, at least at the bow 12b, LED lights 60b on the port side of bow 12b would be coloured or otherwise project a red light, and that LED lights 60a on the starboard side of bow 12b would be coloured or otherwise project a green light, it may be that those LED lights are of a higher power or intensity (higher lumens) or that there are more LED lights per unit length along bow 12b (higher density), both as compared to the LED lights around the rest of edges 12a.

In embodiments falling within the scope of this description, LED lights 60a, 60b may be programmable to change colour, or at least be programmable to appear to change colour, as controlled by a lighting controller, which may be separate or form part of controller 46. Consequently, during the day the LED lights 60a, 60b may be merely decoratively lit up, or may not be activated at all. If lit up during day, the lighting patterns could be programmed to change in colour and sequencing to show moving or static patterns of light, whether in one colour or more than one colour. The purpose of day time lights would be partly for visual appeal as they would appear decorative, and also to increase visibility of surfboard 12 from a distance so as to reduce the likelihood of a daytime collision with another watercraft. To that end, a separately functioning bright point source strobe light may also be included at the bow 12b, or at other locations around edges 12a. Upon the natural light levels falling at dusk, or on a particularly dull day, a user may manually switch the LED lights into navigation lighting mode (for example by a switch located on the remote controller 56), thereby turning on the red and green (port and starboard) bow lights, and dimming the remaining lights relative to the bow lights. As an example, such dimming may be achieved by deactivating every second LED light other than at the bow. In a further embodiment, a light level sensor such as conventionally found in automobiles may be mounted on the upper surface of surfboard 12, communicating with the light controller, so as to automatically turn on the nighttime navigation light mode when required.

In a further alternative embodiment, instead of only the LED lights 60 at the bow 12b being employed as red and green nighttime navigation lights, as seen by way of example in FIGS. 5A-5D, the port side of surfboard 12 along some or all of the length of the port side edges 12a may be red LED lights 60b, and the starboard side of surfboard 12 along some of all of the length of the starboard side edges 12a may be green LED lights 60a. Advantageously the length of the red LED lights 60b around the port side edge would be the same as the length of the green LED lights 60a around the starboard side edge. Extending the length of the red and green lights significantly or completely along the edges 12a on both the port and starboard side edges, would give a much larger lit object which would be more easily viewed from afar. This arrangement may also give an observer viewing the surfboard at night a better indication of whether the surfboard was holding a straight course or changing course, as the surfboard would tilt, even slightly, during a turn, with the inside edge of the surfboard during the turn then dipping slightly. The observer viewing the lit up surfboard at night would be given more visual cues indicating, firstly if the surfboard was heading towards the observer, and secondly, if the surfboard was changing course, either towards or away from the observer.

Turning now to the second problem addressed in this disclosure; namely that problem posed by the need to change the length of mast 10.

Figure 6:
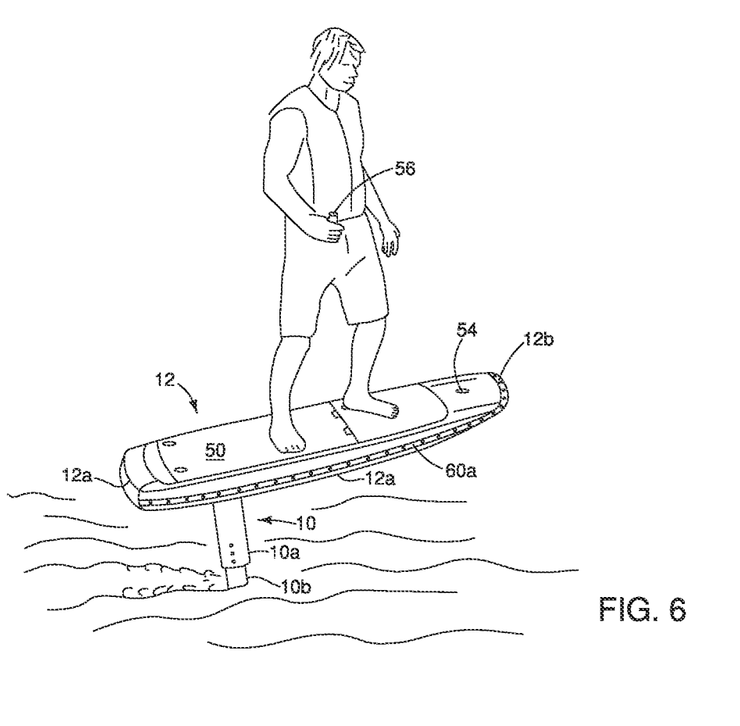
FIG. 6 is a view of a rider using the hydrofoil surfboard according aspects of the present invention, showing the surfboard elevated above the waterline during forward translation at a speed at which the submerged hydrofoil wings exert sufficient lift to raise the weight of the rider and surfboard above the surface of the body of water.

The proposed solution is to change the unitary pillar design of mast 10 to a telescoping mast having an upper mast portion 10a slidably and snugly receiving a lower mast portion 10b telescopically therein as seen by way of example in FIG. 6. Desirably, the range of lengths that could be accomplished would be for example from approximately 70 cm to 110 cm. A fully enclosed telescopic design would, at a maximum, be able to possibly collapse to a length approaching one half of its fully extended length, so for example a 120 cm long mast would at most telescopically shorten to a length approaching 60 cm. Consequently, in a mast having an extended length of approximately one meter (100 cm), a fully enclosed telescopic function would be able to accommodate a shortening by approximately 30-40 cm. By fully enclosed what is meant is that the portion of the mast that is of a slightly narrower width would selectively slide into the portion of the mast having a slightly wider width, so that when fully retracted the narrower width portion is entirely contained within the wider width portion.

Various latching or selective locking mechanisms could be used to selectively adjust the length of the mast between the two extremes of fully extended and fully retracted. For example, the two portions of the mast could have through holes in a spaced array along their length, so that sliding the narrow portion relative to the wider portion brings through holes on both portions into alignment. A removable pin may then be used to releasably lock the selected length of the adjustable length mast. Thus as seen by way of example in FIG. 6, the wider portion is shown a upper portion 10a, and the narrower portion is shown as lower portion 10b, wherein lower portion 10b slides telescopically into upper portion 10a so as to allow adjustment of the length of mast 10. Holes are illustrated extending up the side of upper portion 10a. Lower portion 10b would have corresponding holes, so that once holes on both portions are aligned, the length of the mast could be releasably fixed by means of removable pin (not shown) for example, until it was desired to adjust the lengths of the mast, at which time the pin would be removed, the length adjusted, and the pin reinserted.

What is claimed is:

1. A self-propelled hydrofoil surfboard for use over a body of water by a rider, the hydrofoil surfboard comprising:
    a surfboard having a bow, a stern, and a circumferential edge extending completely around and between an upper surface of the surfboard and a lower surface of the surfboard, wherein the surfboard is adapted to be elevated above a waterline of the body of water,
    a mast mounted to the lower surface of the surfboard so as to extend orthogonally therefrom,
    at least one hydrofoil wing connected to a lower end of the mast,
    a selectively controllable thruster mounted to the mast adjacent the at least one hydrofoil wing to provide selectively controllable forward acceleration to the surfboard for the at least one hydrofoil wing to elevate the surfboard above the waterline,
    a controller mounted in the surfboard and cooperating with the selectively controllable thruster to selectively control the amount of thrust produced by the selectively controllable thruster to provide the forward acceleration to the surfboard, the controller cooperating with a remote controller adapted to give control inputs to the controller and to be carried when in use by the rider riding on the surfboard and simultaneously providing the control inputs, a rechargeable battery removably mounted in the surfboard and in electrical communication with the controller and the selectively controllable thruster to provide electric power to the controller and to the selectively controllable thruster, navigation lights mounted around at least a portion of the circumferential edge of the surfboard along both port and starboard sides of the surfboard, wherein a color of the navigation lights on the port side of the surfboard is different from a color of the navigation lights on the starboard side of the surfboard, and wherein when the navigation lights are illuminated and the surfboard is elevated above the waterline, the circumferential edge is also correspondingly elevated above the waterline and the illuminated navigation lights mounted therealong radiate from the circumferential edge of the elevated surfboard for ease of viewing by an observer, from afar, of the elevated surfboard for determining, from afar, the direction of travel, speed of the surfboard and whether the surfboard is turning in order to avoid a collision with the surfboard.

2. The hydrofoil surfboard of claim 1 wherein the navigation lights include LED lights.

3. The hydrofoil surfboard of claim 1 wherein the navigation lights extend at least around the bow of the surfboard.

4. The hydrofoil surfboard of claim 3 wherein the navigation lights include red lights on the port side of the bow, and green lights on the starboard side of the bow.

5. The hydrofoil surfboard of claim 1 wherein the navigation lights extend along the full length of the circumferential edge of the surfboard.

6. The hydrofoil surfboard of claim 1 wherein the navigation lights include red port lights and green starboard lights in the absence of natural daylight, and include other than red or green lights in the presence of natural daylight.

7. The hydrofoil surfboard of claim 6 wherein the lights in the absence of natural daylight are a nighttime mode, and wherein the lights in the presence of natural daylight are a daytime mode, and wherein the rider selectively switches between the nighttime and daytime modes by providing an input to a light controller.

8. The hydrofoil surfboard of claim 1 wherein the mast is adapted to have a selectively adjustable length.

9. The hydrofoil surfboard of claim 8 wherein the mast is telescopically adjustable to selectively adjust the length of the mast.

10. A method of using the hydrofoil surfboard of claim 1 comprising the steps of:

the rider boarding the surfboard while it is floating on a body of water, providing the control inputs to the controller to accelerate the surfboard to a lifting velocity whereat the surfboard, the circumferential edge, the navigation lights and the rider are elevated above the waterline while translating forwardly through the body of water, and providing control input to a light controller to illuminate the navigation lights thereby illuminating the circumferential edge and consequently the circumference of the elevated surfboard.

* * * * *